April 24, 1928.　　　　W. E. RAWLINGS　　　1,667,048
TRAP
Filed Jan. 26, 1927
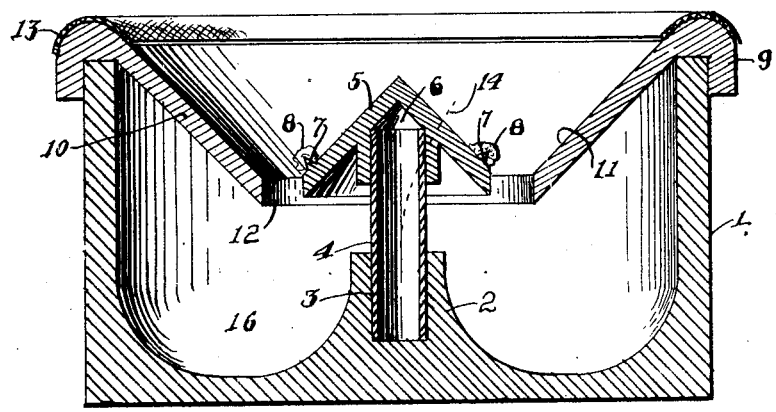
INVENTOR
William E. Rawlings
John A. Naismith
ATTORNEY Patented Apr. 24, 1928.

1,667,048

UNITED STATES PATENT OFFICE.

WILLIAM E. RAWLINGS, OF NEAR SAN JOSE, CALIFORNIA.

TRAP.

Application filed January 26, 1927. Serial No. 163,752.

This invention relates particularly to traps for use in catching rodents.

It is the object of the invention to provide a trap so designed and arranged as to catch the rodent or other animal without injury, whereby it can be killed in any suitable manner without suffering.

It is another object of the invention to provide a trap of the character indicated that will be economical in construction, simple in form and operation, quickly and easily assembled and disassembled, easily cleaned, and highly efficient in trapping an animal without causing it undue bodily suffering.

The drawing is a vertical transverse section through a device embodying my invention.

Referring now more particularly to the drawing, I show at 1 a receptacle preferably cast in transparent glass and provided with a raised boss 2 in its center as shown, this boss having a vertical hole 3 formed in its vertical axis. Set in the hole 2 is a resilient member of any suitable kind such as a rubber tube 4. At 5 I show a conical element of glass or any other suitable material preferably having a glazed outer surface and having a recess 6 formed in its under surface to engage the upper end of the tube 4. On the outer surface of the cone 5 are formed a number of prongs 7 to form supports for bait as 8.

At 9 is shown a member adapted to fit over the top of the receptacle 1 like a cover, but having its central portion directed downwardly toward the bottom of the receptacle and shaped in the form of an inverted truncated cone. The upper surface of the conical portion 10 is preferably glazed or made smooth in any suitable manner whereby to render it difficult for a rodent stepping down upon it to keep its footing, this smooth surface being indicated by the reference 11. The open end of the portion 10 is shown at 12, and this opening is slightly larger than the diameter of the base portion of the conical member 5 and is arranged concentric thereto. A strip of fabric may be mounted upon the upper edge of the member 9 as shown.

When the device has been constructed and assembled as described with some suitable bait mounted on the prongs 7 it is ready for use.

A rodent may move safely about the upper edge of the member 9 because of the fabric 13 mounted thereon, but when it attempts to reach the bait 8 it will lose its foothold when attempting to negotiate the surface 11 and slip downward against the side of element 5, thereby causing it to bend over say into the position indicated by the line 14. Since the element 5 is also smooth the rodent slips into the chamber 16, from which there is no exit.

An animal caught in this manner is not tortured, but may be quickly discovered and put to death in a painless manner.

It is to be understood, of course, that while I have herein shown and described but one specific embodiment of the invention, changes in form, construction, and method of operation may be made within the scope of the appended claims.

I claim:

1. A device of the character indicated, comprising a receptacle, an upstanding yieldable element mounted upon the bottom thereof, and a chute extending downwardly into the receptacle to a point adjacent the said yieldable element.

2. A device of the character described comprising a receptacle, a conical element yieldingly mounted in the center thereof, and a cap member for the receptacle having its central portion extending downwardly into the receptacle to a point adjacent the conical element.

3. A device of the character described, comprising a receptacle, an element yieldingly mounted within the receptacle, and a cap member for the receptacle having a portion extending downwardly into the receptacle to a point adjacent the yielding element.

4. A device of the character described, comprising a receptacle, an element yieldingly mounted within the receptacle and means for supporting bait thereon, and a cap member having a smooth upper surface extending downwardly into the receptacle to a point adjacent the yielding element.

WILLIAM E. RAWLINGS.